US012428873B2

(12) United States Patent
Niegmann

(10) Patent No.: US 12,428,873 B2
(45) Date of Patent: Sep. 30, 2025

(54) ACTUATING DEVICE FOR LOCK DEVICE, AND LOCK DEVICE

(71) Applicant: ASSA ABLOY AB, Stockholm (SE)

(72) Inventor: Kaj Niegmann, Hägersten (SE)

(73) Assignee: ASSA ABLOY AB, Stockholm (SE)

( * ) Notice: Subject to any disclaimer, the term of this patent is extended or adjusted under 35 U.S.C. 154(b) by 169 days.

(21) Appl. No.: 18/015,408

(22) PCT Filed: Jun. 10, 2021

(86) PCT No.: PCT/EP2021/065567
§ 371 (c)(1),
(2) Date: Jan. 10, 2023

(87) PCT Pub. No.: WO2022/012818
PCT Pub. Date: Jan. 20, 2022

(65) Prior Publication Data

US 2023/0258025 A1 Aug. 17, 2023

(30) Foreign Application Priority Data

Jul. 15, 2020 (SE) .................................... 2050895-8

(51) Int. Cl.

| | |
|---|---|
| ***E05B 47/06*** | (2006.01) |
| ***E05B 13/00*** | (2006.01) |
| ***E05B 47/00*** | (2006.01) |

(52) U.S. Cl.
CPC ........ *E05B 47/0661* (2013.01); *E05B 13/004* (2013.01); *E05B 47/0012* (2013.01);
(Continued)

(58) Field of Classification Search
CPC ............. E05B 47/0661; E05B 47/0012; E05B 47/0603; E05B 47/0615; E05B 47/0657;
(Continued)

(56) References Cited

U.S. PATENT DOCUMENTS 5,325,046 A * 6/1994 Young ...................... G06F 1/266
323/356
9,322,194 B2 * 4/2016 Cheng ................ G07C 9/00571
(Continued)

FOREIGN PATENT DOCUMENTS

CN 103732844 4/2014
DE 102004052802 4/2006
(Continued)

OTHER PUBLICATIONS

Opponents Reply in Opposition with English Translation for Sweden Patent No. 2050895-8, dated Jan. 24, 2023, 10 pages.
(Continued)

*Primary Examiner* — Christine M Mills
*Assistant Examiner* — Yahya Sidky
(74) *Attorney, Agent, or Firm* — Schwegman Lundberg & Woessner, P.A.

(57) ABSTRACT

An actuating device (12) comprising a stationary structure (20); an actuating element (22) rotatable relative to the stationary structure (20); an electric power source (24, 82); a spindle (26) arranged to be rotated by rotation of the actuating element (22); a locking member (28) movable between a locked position (66) and an unlocked position (86); an electromechanical transfer device (30, 84) arranged in the spindle (26), the transfer device (30, 84) being configured to adopt a locked state (68) and an unlocked state (78); a receiver device (34) fixed with respect to the spindle (26), the receiver device (34) being electrically connected to the transfer device (30, 84); and a transmitter device (32) fixed with respect to the stationary structure (20) and arranged to be electrically powered by the power source (24, 82), the transmitter device (32) being configured to wirelessly transmit power to the receiver device (34).

15 Claims, 8 Drawing Sheets

(52) U.S. Cl.
CPC .. *E05B 47/0603* (2013.01); *E05B 2047/0017* (2013.01); *E05B 2047/002* (2013.01); *E05B 2047/0062* (2013.01)

(58) Field of Classification Search
CPC .... E05B 47/0676; E05B 47/068; E05B 47/02; E05B 47/06; E05B 13/004; E05B 2047/0017; E05B 2047/002; E05B 2047/0062; E05B 2047/0057; E05B 2047/0061; E05B 2047/0094; E05B 2047/0095; E05B 81/80; E05B 81/84
See application file for complete search history.

(56) References Cited

U.S. PATENT DOCUMENTS

| | | | |
|---|---|---|---|
| 2004/0250578 | A1 | 12/2004 | Saikai |
| 2011/0174029 | A1 | 7/2011 | Lappalainen et al. |
| 2012/0111072 | A1 | 5/2012 | Pukari et al. |
| 2016/0163139 | A1 | 6/2016 | Kankkunen et al. |
| 2017/0040827 | A1 | 2/2017 | Weber |
| 2017/0107739 | A1 | 4/2017 | Ruff |
| 2018/0258666 | A1 * | 9/2018 | Wong .................. E05B 47/0661 |
| 2018/0328075 | A1 | 11/2018 | Coster et al. |

FOREIGN PATENT DOCUMENTS

| | | |
|---|---|---|
| DE | 102014105432 | 10/2015 |
| EP | 0462316 | 12/1991 |
| EP | 1722049 | 11/2006 |
| FR | 2677396 | 12/1992 |
| JP | 6034480 | 11/2016 |
| KR | 101511059 | 4/2015 |
| SE | 1930377 | 5/2020 |
| WO | WO 92/22720 | 12/1992 |
| WO | WO 2017/165424 | 9/2017 |
| WO | WO 2019/166389 | 9/2019 |
| WO | WO 2020/100172 | 5/2020 |

OTHER PUBLICATIONS

English Translation of Notice of Opposition for Sweden Patent No. 2050895-8, dated Nov. 24, 2022, 3 pages.
Official Action for Sweden Patent Application No. 2050895-8, dated Mar. 25, 2021, 37 pages.
Notice of Opposition with Machine Translation for Sweden Patent Application No. 2050895-8, dated Nov. 24, 2022, 5 pages.
Opposition with English Translation for Sweden Patent Application No. 2050895-8, dated Dec. 29, 2022, 4 pages.
International Search Report and Written Opinion for International (PCT) Patent Application No. PCT/EP2021/065567, dated Aug. 25, 2021, 13 pages.
"Chinese Application No. 202180049835.4 First Office Action mailed May 22, 2025", with English translation, 12 pages.

* cited by examiner

ACTUATING DEVICE FOR LOCK DEVICE, AND LOCK DEVICE

CROSS REFERENCE TO RELATED APPLICATIONS

This application is a national stage application under 35 U.S.C. 371 and claims the benefit of PCT Application No. PCT/EP2021/065567 having an international filing date of Jun. 10, 2021, which designated the United States, which PCT application claimed the benefit of Sweden Patent Application No. 2050895-8 filed Jul. 15, 2020, the disclosure of each of which are incorporated herein by reference.

TECHNICAL FIELD

The present disclosure generally relates to an actuating device. In particular, an actuating device for a lock device, and a lock device comprising an actuating device, are provided.

BACKGROUND

Some electromechanical lock cylinders comprise a cylinder housing, a locking member rotatably arranged in the cylinder housing, a rotatable knob and an electromechanical coupling device for selectively coupling the knob with the locking member. When a user has been authorized, the coupling device couples the knob and the locking member and the lock can be opened by manually rotating the knob.

Some of these lock cylinders comprise a battery for powering the coupling device and electronics, such as credential evaluation electronics, arranged in the knob. The battery and the electronics are typically arranged in the rotatable knob in order to prevent cables from getting entangled or disconnected. When the knob rotates, the battery, the electronics and the coupling device rotate. This leads to a product which relies on a coupling device housing to absorb most forces during use. Moreover, if the knob is smashed away by a criminal in a so-called brute force attack, electronics inside the knob may be exposed for unauthorized tampering.

DE 102014105432 A1 discloses an electromechanical lock cylinder comprising a cylinder housing, a knob, a clutch and an electromotor working as a generator.

SUMMARY

One object of the present disclosure is to provide an actuating device for a lock device, which actuating device is secure.

A further object of the present disclosure is to provide an actuating device for a lock device, which actuating device has a less complicated design and/or operation.

A still further object of the present disclosure is to provide an actuating device for a lock device, which actuating device has a reliable design and/or operation.

A still further object of the present disclosure is to provide an actuating device for a lock device, which actuating device has a cost effective design and/or operation.

A still further object of the present disclosure is to provide an actuating device for a lock device, which actuating device solves several or all of the foregoing objects in combination.

A still further object of the present disclosure is to provide a lock device comprising an actuating device, which lock device solves one, several or all of the foregoing objects.

According to one aspect, there is provided an actuating device for a lock device, the actuating device comprising a stationary structure; an actuating element rotatable relative to the stationary structure; an electric power source; a spindle arranged to be rotated by rotation of the actuating element; a locking member movable between a locked position and an unlocked position; an electromechanical transfer device arranged in the spindle, the transfer device being configured to adopt a locked state, in which the locking member cannot be moved from the locked position to the unlocked position by rotation of the actuating element, and an unlocked state in which the locking member can be moved from the locked position to the unlocked position by rotation of the actuating element; a receiver device fixed with respect to the spindle, the receiver device being electrically connected to the transfer device; and a transmitter device fixed with respect to the stationary structure and arranged to be electrically powered by the power source, the transmitter device being configured to wirelessly transmit power to the receiver device.

The stationary transmitter device is thus arranged to wirelessly transfer electric power to the rotatable receiver device. Moreover, since the spindle is arranged to be rotated by rotation of the actuating element, mechanical energy can be transferred from the actuating element to the spindle by manual rotation of the actuating element.

By arranging the transfer device in the spindle, unauthorized access to the transfer device is made more difficult. Consequently, the actuating device is made more secure.

The actuating element may be rotatable about an actuation axis. The actuating element may be a knob.

The spindle may be arranged to rotate in common with the actuating element. Alternatively, or in addition, the spindle may be arranged to rotate about the actuation axis. Alternatively, or in addition, the actuating device may further comprise a transmission arranged to transmit a rotation of the actuating element to a rotation of the spindle. The transmission may comprise a gear train. The spindle may comprise a plug.

The power source may be fixed with respect to the stationary structure. Electric cables may be provided between the power source and the transmitter device. The locking member may be rotatable between the locked position and the unlocked position.

The transfer device may be arranged entirely within the stationary structure. Alternatively, or in addition, the transfer device may be fixed to the spindle. In this way, the transfer device rotates in common with the spindle.

The transfer device may comprise a coupling device configured to couple the spindle to the locking member when adopting the locked state, and configured to decouple the spindle from the locking member when adopting the unlocked state. In this case, the spindle and the locking member may rotate in common when the coupling device adopts the locked state. When the coupling device adopts the unlocked state, the actuating element can be rotated but this rotation is not transferred to any movement of the locking member.

Alternatively, the transfer device may comprise a blocking device configured to block rotation of the spindle when adopting the locked state, and configured to unblock rotation of the spindle when adopting the unlocked state. In this case, the spindle and the locking member may be fixedly connected or integrally formed. When the blocking device adopts the locked state, the actuating element cannot be rotated. When the blocking device adopts the unlocked state, rotation of the actuating element is transferred to a common rotation of the spindle and the locking member.

The power source may comprise an electromagnetic generator arranged to be driven by rotation of the actuating element to thereby generate electric energy. The actuating device comprising the generator is an energy harvesting actuating device. The generator may comprise a stator and a rotor, where the rotor is arranged to be rotationally driven relative to the stator by rotation of the actuating element to thereby generate electric energy.

The actuation device may for example comprise power management electronics configured to manage the energy harvesting and to control the supply of power to the transfer device. To this end, the power management electronics may comprise energy harvesting electronics, such as diodes for rectifying the voltage from the electric generator and a passive non-chemical electric energy storage device, such as a capacitor. Thereby, electric energy can be harvested from rotation of the actuating element in either direction about the actuation axis. The electric energy storage device may or may not comprise a battery.

The electric energy storage device may be fixed with respect to the stationary structure, i.e. provided on the “outside”. Alternatively, the electric energy storage device may be fixed with respect to the spindle, i.e. provided on the “inside”. In the former case, harvested electric energy may initially be bulked in the electric energy storage device prior to transmission from the transmitter device to the receiver device. In the latter case, harvested electric energy may be directly transmitted from the transmitter device to the receiver device and then stored in the electric energy storage device on the “inside”.

Alternatively, or in addition, the power source may comprise a battery instead of a generator.

The transmitter device may be configured to inductively transmit power to the receiver device. The transmitter device may comprise an electromagnetic wave transmission coil and the receiver device may comprise an electromagnetic wave receiving coil. The electromagnetic wave transmission coil and the electromagnetic wave receiving coil may be near field communication (NFC) transmission coils. Each of the transmitter device and the receiver device may comprise a resonant capacitance. Electric power can be transferred from the transmitter device to the receiver device through magnetic field resonance between the electromagnetic wave transmission coil and the electromagnetic wave receiving coil. The transmitter device may further comprise an amplifier unit having a switching circuit. The receiver device may further comprise a power reception unit having a rectifying and smoothing circuit. The electromagnetic wave transmission coil and the electromagnetic wave receiving coil together form a transformer. An alternating current through the electromagnetic wave transmission coil creates an oscillating magnetic field by Ampere’s law. The magnetic field passes through the electromagnetic wave receiving coil where it induces an alternating electromotive force, EMF, (voltage) by Faraday’s law of induction, which creates an alternating current in the electromagnetic wave receiving coil.

The spindle may be rotatable about a rotation axis. In this case, each of the transmitter device and the receiver device may be substantially centered, or centered, with respect to the rotation axis. In this way, the transmitter device and the receiver device are always coaxially arranged. Moreover, the transmitter device and the receiver device may be arranged at a fixed distance. In these ways, energy transfer efficiency between the transmitter device and the receiver device can be maximized. The rotation axis may be concentric with the actuation axis.

The spindle may be arranged inside the stationary structure. In this way, the stationary structure protects the transfer device from unauthorized tampering should the actuating element be removed in a brute force attack.

The actuating device may further comprise a connection member functionally connected between the actuating element and the spindle. In this case, the connection member may be arranged to release upon removal of the actuating element. With functionally connected is meant that a rotation of the actuating element transmitted to a rotation of the spindle at least partly by the connection member. In case the actuating device is subjected to a brute force attack such that the actuating element is removed, the release of the connection member makes it difficult to rotate the spindle. Moreover, the force from the brute force attack is not transmitted to the transfer device once the connection member has released. In this way, the security of the actuating device is further improved.

The transmitter device may comprise a transmitter device opening and the receiver device may comprise a receiver device opening. In this case, the connection member may pass through the transmitter device opening and the receiver device opening.

The connection member may be connected to the spindle by means of a shape lock. A first end of the connection member may be connected to the spindle by means of the shape lock. A second end of the connection member may be fixed to the actuating element, such as integrally formed with the actuating element. Alternatively, the second end of the connection member may be fixed to a part of a transmission of the actuating device.

The connection member may comprise a polygonal cross-sectional profile and the spindle may comprise an opening having a corresponding polygonal cross-sectional profile. One example of such polygonal cross-sectional profile is a square shape.

The connection member may be a bar. Alternatively, or in addition, the connection member may be made of metal.

The transmitter device may be configured to wirelessly transmit a signal to the receiver device. Alternatively, or in addition, the receiver device may be configured to wirelessly transmit a signal to the transmitter device. In these ways, data can be wirelessly transmitted between the receiver device and the transmitter device.

The actuating device may further comprise credential evaluation electronics provided in the spindle and credential reading electronics. In this case, the credential evaluation electronics may be configured to evaluate an access signal from the credential reading electronics and to issue an authorization signal to the transfer device to adopt the unlocked state upon a granted evaluation of the access signal. The access signal may contain credential data associated with a user.

The credential reading electronics may comprise a receiving unit, such as an antenna, for receiving an input signal, and a reading unit. The credential reading electronics may be configured to send the access signal to the credential evaluation electronics. The credential evaluation electronics may be configured to determine whether or not authorization should be granted based on the access signal. If access is granted, e.g. if a valid credential is presented, the credential evaluation electronics may issue the authorization signal. If access is not granted, e.g. if an invalid credential is presented or if no credential is presented, the credential evaluation electronics may not issue the authorization signal.

The power management electronics and the credential reading electronics may be arranged inside the actuating element and the credential evaluation electronics may be arranged inside the spindle. The credential reading electronics may be arranged to communicate wirelessly with an external device, such as a mobile phone. The wireless communication may for example be carried out by means of BLE (Bluetooth Low Energy) or RFID (Radio Frequency Identification). As an alternative to wireless communication, a user may input a code to the credential reading electronics, for example via a keypad. If an authorization request is denied, the transfer device is not switched, i.e. remains in the locked state.

By arranging the credential evaluation electronics in the spindle, unauthorized access to the credential evaluation electronics is made more difficult. The credential evaluation electronics is thus arranged deep inside the actuating device. Consequently, the actuating device is made more secure.

The actuating device may further comprise a feedback indicator. The actuating device may be configured to issue a feedback indication to the user by means of the feedback indicator based on an outcome of the evaluation of the access signal. Examples of feedback indicators are a loud speaker for issuing an audible indication, a light source for issuing a visible indication and a vibration device for issuing a tactile indication. The feedback indication may be of a first type upon a granted authorization of the access signal, and of a second type, different from the first type, upon a denied authorization of the access signal.

In case the actuating device comprises the feedback indicator, the receiver device may be configured to wirelessly transmit a feedback signal to the transmitter device. The feedback signal may be issued by the credential evaluation electronics.

The credential reading electronics may be fixed with respect to the stationary structure. In this case, the transmitter device may be configured to wirelessly, such as inductively, transmit the access signal to the receiver device.

Alternatively, the credential reading electronics may be fixed with respect to the spindle, e.g. arranged in the spindle.

The power source may be fixed with respect to the stationary structure.

According to a further aspect, there is provided a lock device comprising an actuating device according to the present disclosure. The lock device may further comprise a cylinder housing. The locking member may be rotatably arranged within the cylinder housing.

The lock device may further comprise a driver. In this case, movement of the locking member from the locked position to the unlocked position may cause the driver to move from a driver locked position to a driver unlocked position. Conversely, movement of the locking member from the unlocked position to the locked position may cause the driver to move from the driver unlocked position to the driver locked position.

BRIEF DESCRIPTION OF THE DRAWINGS

Further details, advantages and aspects of the present disclosure will become apparent from the following description taken in conjunction with the drawings, wherein.

DETAILED DESCRIPTION

Figure 1:
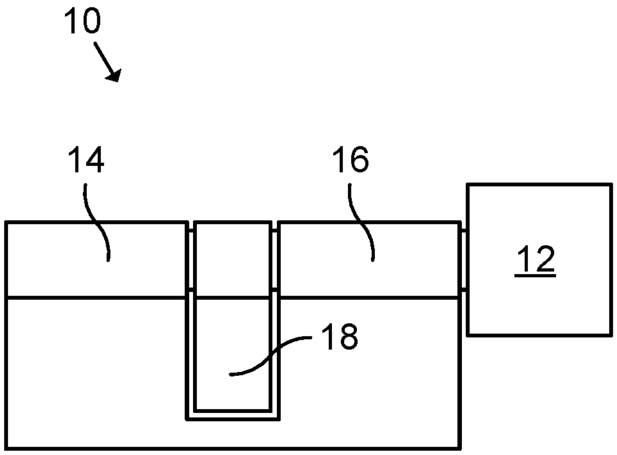
FIG. 1: schematically represents a side view of a lock device comprising an actuating device.

In the following, an actuating device for a lock device, and a lock device comprising an actuating device, will be described. The same or similar reference numerals will be used to denote the same or similar structural features.

FIG. 1 schematically represents a side view of a lock device 10. The lock device 10 comprises an actuating device 12. The lock device 10 of this specific example further comprises a first cylinder half 14, a second cylinder half 16 and a driver 18. The first cylinder half 14 and the second cylinder half 16 form one example of a cylinder housing. The driver 18 can actuate a bolt (not shown) of the lock device 10.

Figure 2:
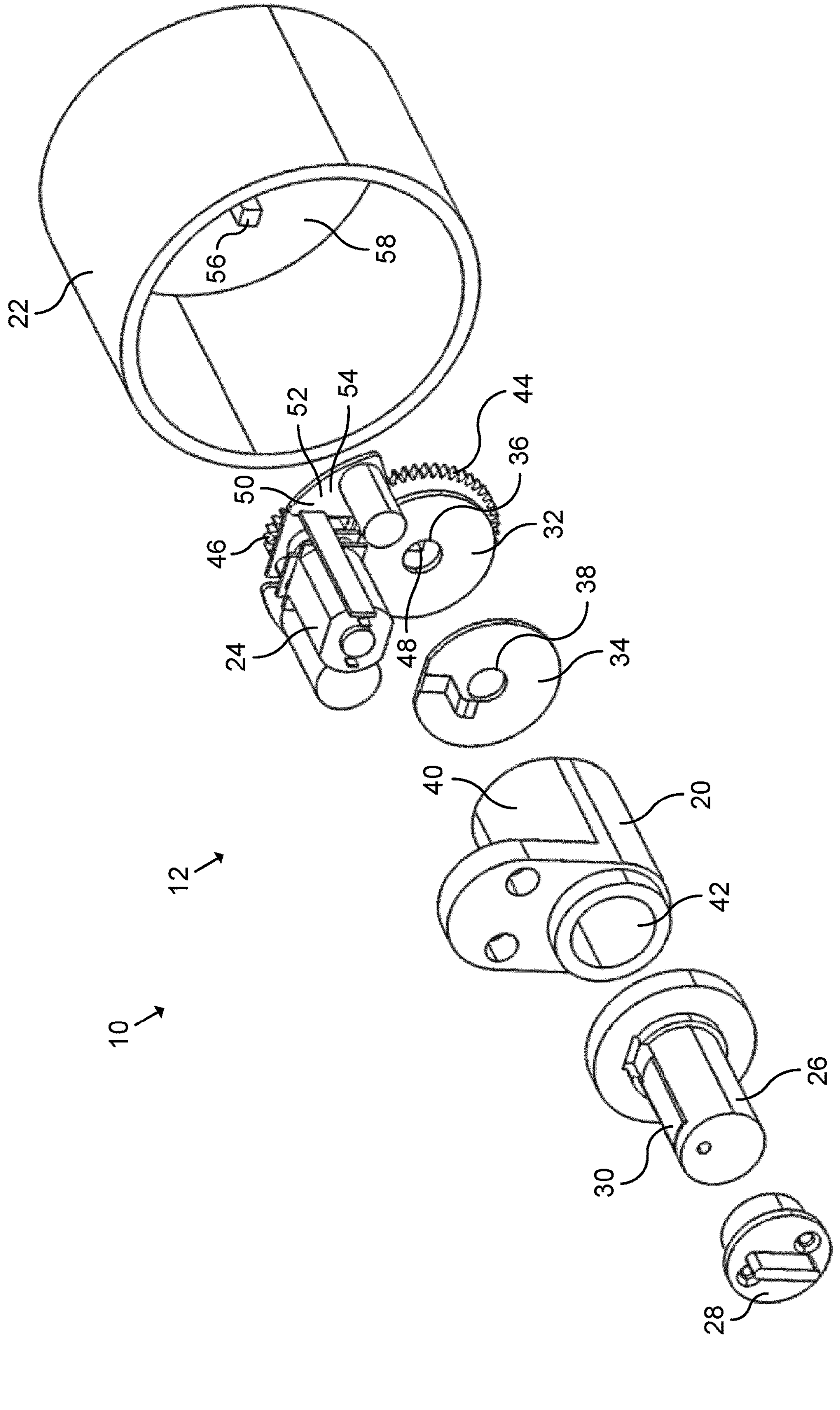
FIG. 2: schematically represents an exploded perspective view of the actuating device.

FIG. 2 schematically represents an exploded perspective view of the actuating device 12. The actuating device 12 comprises a stationary structure 20, an actuating element 22, an electromagnetic generator 24, a spindle 26, a locking member 28 and an electromechanical coupling device 30. The actuating element 22 of this example is a knob.

The generator 24 is one example of an electric power source according to the present disclosure. The coupling device 30 is one example of an electromechanical transfer device according to the present disclosure. The coupling device 30 of this example comprises an actuator having an actuator pin (not shown).

The actuating device 12 further comprises a transmitter device 32 and a receiver device 34. The transmitter device 32 comprises a transmitter device opening 36. The receiver device 34 comprises a receiver device opening 38.

The stationary structure 20 of this specific example comprises a body 40 and a through hole 42. The through hole 42 extends through the body 40.

The actuating device 12 of this specific example further comprises a first gear wheel 44 and a second gear wheel 46. The first gear wheel 44 meshes with the second gear wheel 46. The first gear wheel 44 comprises a square through hole 48.

The actuating device 12 of this specific example further comprises credential reading electronics 50 and power management electronics 52. The credential reading electronics 50 comprises a receiving unit (not shown), such as an antenna, for receiving an input signal, and a reading unit (not shown). The credential reading electronics 50 is arranged to communicate wirelessly with an external device, such as a mobile phone, for example by means of BLE.

The actuating device 12 further comprises a feedback indicator 54. The feedback indicator 54 is configured to issue a feedback indication to a user. The feedback indicator 54 may for example be a loud speaker, a light source or a vibration device.

The actuating device 12 of this specific example further comprises a connection member 56. The connection member 56 of this example is a bar integrally formed with the actuating element 22. The connection member 56 protrudes distally from an end 58 of the actuating element 22 into the interior of the actuating element 22. As used herein, a distal direction is a direction away from the user (e.g. towards the locking member 28) and a proximal direction is a direction towards the user.

Figure 3:
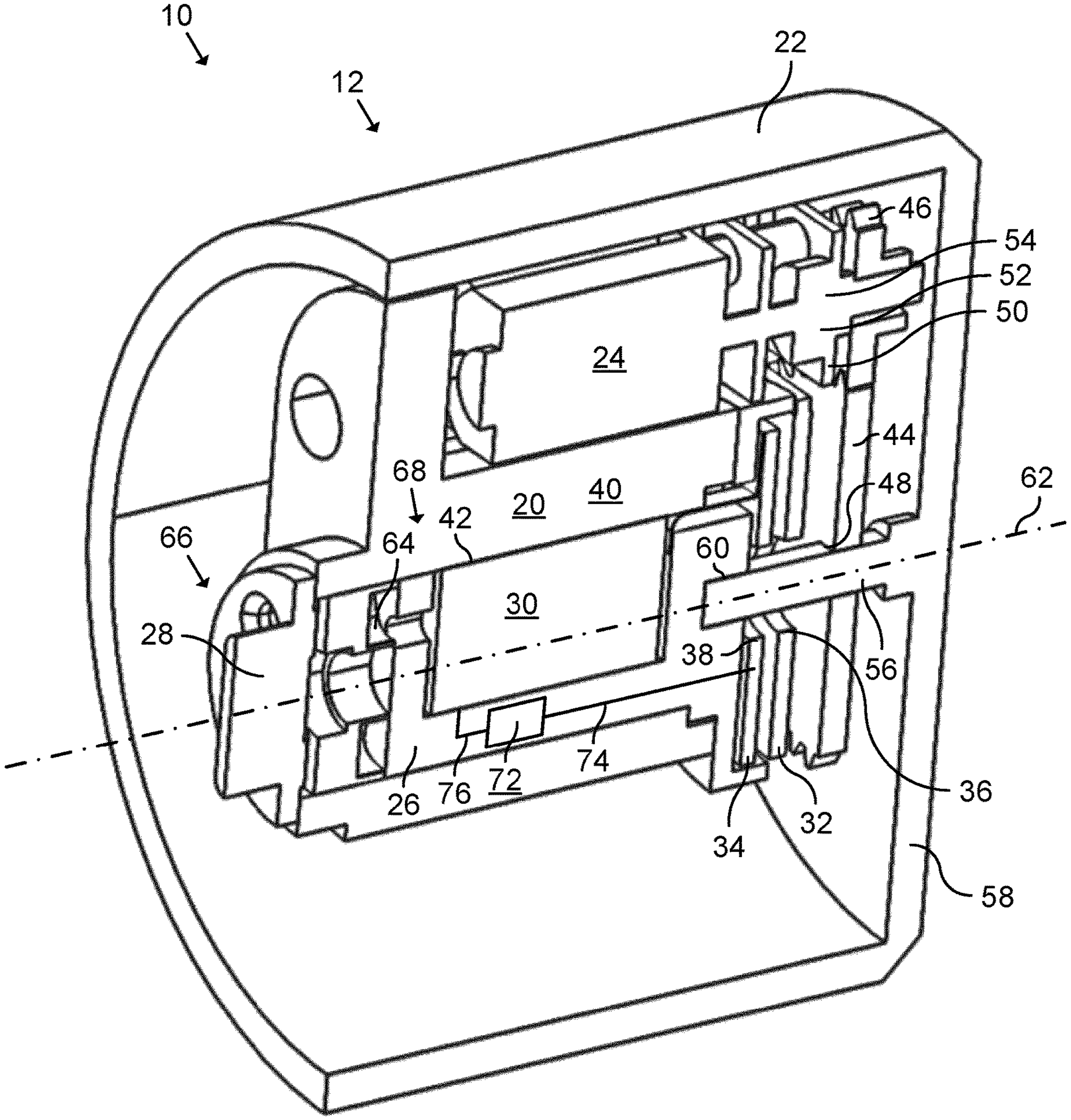
FIG. 3: schematically represents a perspective cross-sectional view of the actuating device.
Figure 4:
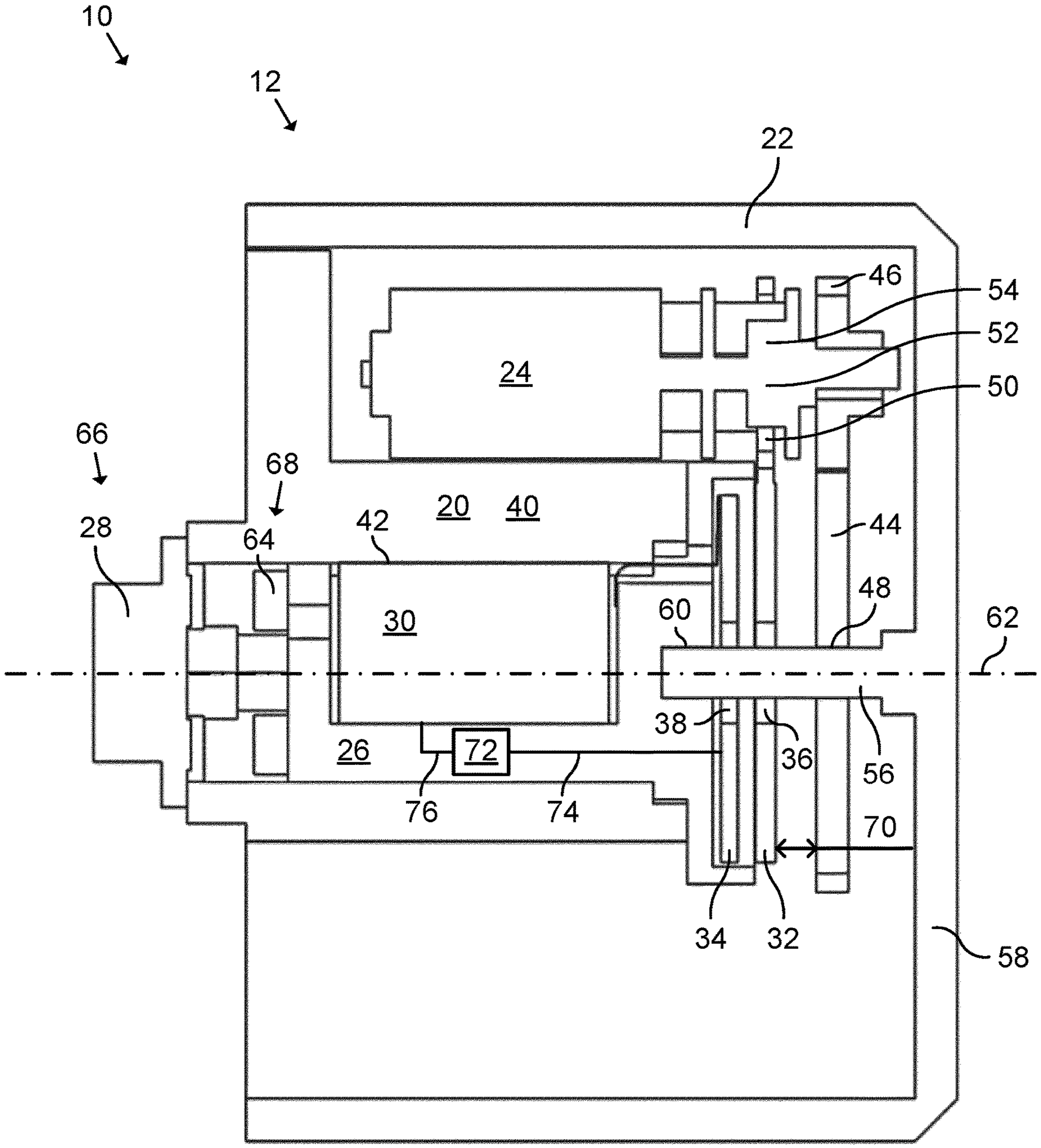
FIG. 4: schematically represents a cross-sectional side view of the actuating device.

FIG. 3 schematically represents a perspective cross-sectional view of the actuating device 12, and FIG. 4 schematically represents a cross-sectional side view of the actuating device 12. With collective reference to FIGS. 3 and 4, the spindle 26 is arranged inside the body 40 of the stationary structure 20. The stationary structure 20 may be bolted to a lock case (not shown) of the lock device 10. The generator 24 is fixed to the stationary structure 20.

The connection member 56 engages the first gear wheel 44 and the spindle 26. Moreover, the connection member 56 passes through the transmitter device opening 36 and the receiver device opening 38. The connection member 56 of this example comprises a square cross-sectional profile. The square cross-sectional profile of the connection member 56 engages the square through hole 48 of the first gear wheel 44. The square cross-sectional profile of the connection member 56 further engages the spindle 26. To this end, the spindle 26 comprises a proximal opening in which an end of the connection member 56 is received. The connection member 56 engages the spindle 26 by means of a shape lock 60. Due to the shape lock 60, rotation of the connection member 56 is transferred to a rotation of the spindle 26. However, the connection member 56 can be retracted proximally away from the spindle 26. One or more bearings (not shown) are provided between the stationary structure 20 and the actuating element 22.

The coupling device 30 is arranged in and fixed to the spindle 26. The stationary structure 20 thereby protects the coupling device 30 from unauthorized tampering. The spindle 26 is arranged to be rotated by manual rotation of the actuating element 22 about an actuation axis 62.

The locking member 28 comprises a recess 64 for receiving the actuator pin of the coupling device 30. The recess 64 faces in the proximal direction.

The locking member 28 is rotatable between a locked position 66 and an unlocked position. In FIGS. 3 and 4, the locking member 28 is in the locked position 66. The locking member 28 is rotatably arranged within the cylinder housing (see FIG. 1).

The coupling device 30 is configured to adopt a locked state 68 and an unlocked state. In FIGS. 3 and 4, the coupling device 30 is in the locked state 68. In the locked state 68 of the coupling device 30, the spindle 26 can be rotated by means of manual rotation of the actuating element 22, but the rotation of the spindle 26 is not transmitted to a rotation of the locking member 28 by means of the coupling device 30. In the unlocked state of the coupling device 30, the spindle 26 is coupled to the locking member 28 by means of the coupling device 30. The spindle 26 and the locking member 28 thereby rotate in common and the locking member 28 can be rotated from the locked position 66 to the unlocked position by manual rotation of the actuating element 22. When the transfer device is constituted by the coupling device 30, the locked state 68 and the unlocked state are thus constituted by an uncoupled state and a coupled state, respectively.

The receiver device 34 is fixed to the spindle 26. The receiver device 34 and the spindle 26 thereby rotate in common. The receiver device 34 is electrically connected to the coupling device 30. The transmitter device 32 is fixed to the stationary structure 20. The transmitter device 32 is electrically powered by the generator 24.

In this specific example, rotation of the actuating element 22 about the actuation axis 62 causes the first gear wheel 44 to rotate by means of the engagement between the connection member 56 and the first gear wheel 44. The rotation of the first gear wheel 44 is transmitted to a rotation of the second gear wheel 46 by means of the meshing engagement therebetween. Rotation of the second gear wheel 46 drives a rotor (not shown) relative to a stator (not shown) of the generator 24 to thereby generate electric energy. The generator 24 is thus arranged to be driven by manual rotation of the actuating element 22 to harvest electric energy.

Moreover, in this specific example, rotation of the actuating element 22 about the actuation axis 62 causes the spindle 26 to rotate due to the engagement between the connection member 56 and the spindle 26 by means of the shape lock 60. This is one of many realizations of arranging the spindle 26 to rotate by means of rotation of the actuating element 22. The connection member 56 is thus functionally connected between the actuating element 22 and the spindle 26.

The power management electronics 52 is configured to manage the energy harvesting and to control the supply of power to the coupling device 30. To this end, the power management electronics 52 comprises energy harvesting electronics (not shown), such as diodes for rectifying the voltage from the generator 24 and a passive non-chemical electric energy storage device (not shown), such as a capacitor. Thereby, electric energy can be harvested from rotation of the actuating element 22 in either direction about the actuation axis 62. In this example, the power management electronics 52 is fixed with respect to the stationary structure 20.

When the actuating element 22 is manually rotated relative to the stationary structure 20 about the actuation axis 62, the receiver device 34 rotates but the transmitter device 32 is stationary. The transmitter device 32 and the receiver device 34 are arranged at a fixed distance. The transmitter device 32 and the receiver device 34 are separated by an air gap 70.

The transmitter device 32 is configured to wirelessly and inductively transmit power and signals to the receiver device 34. To this end, the transmitter device 32 comprises an electromagnetic wave transmission coil and the receiver device 34 comprises an electromagnetic wave receiving coil. The receiver device 34 is also configured to wirelessly and inductively transmit signals to the transmitter device 32. The transmission coil and the receiving coil are concentric with respect to a rotation axis of the spindle 26. In this non-limiting example, the rotation axis of the spindle 26 is concentric with the actuation axis 62.

The actuating device 12 further comprises credential evaluation electronics 72. The credential evaluation electronics 72 is arranged in the spindle 26. Unauthorized access to the credential evaluation electronics 72 is thereby made more difficult. The credential reading electronics 50 is arranged on the "outside", i.e. fixed with respect to the stationary structure 20. In this example, the power management electronics 52 and the credential reading electronics 50 are arranged inside the actuating element 22, but outside the spindle 26, while the credential evaluation electronics 72 is arranged inside the spindle 26.

The credential reading electronics 50 is configured to send an access signal 74 to the credential evaluation electronics 72. The access signal 74 contains credential data associated with a user. As shown in FIGS. 3 and 4, the access signal 74 is transmitted wirelessly from the transmitter device 32 to the receiver device 34. The credential evaluation electronics 72 is configured to evaluate the access signal 74. In addition to authorization, the credential evaluation electronics 72 may be configured to authenticate the access signal 74, i.e. to determine an authenticity of the user based on the access signal 74.

If access is denied, i.e. if the access signal 74 contains an invalid credential or no credential, the credential evaluation electronics 72 sends a denied feedback signal to the feedback indicator 54. In response to the denied feedback signal, the feedback indicator 54 issues a denied feedback indication, e.g. a sound of a first type. The denied feedback signal is wirelessly transmitted from the receiver device 34 to the transmitter device 32.

If access is granted, i.e. if the access signal 74 contains a valid credential, the credential evaluation electronics 72 sends an authorization signal 76 to the coupling device 30. In response to the authorization signal 76, the coupling device 30 moves from the locked state 68 to the unlocked state. Moreover, the credential evaluation electronics 72 sends a granted feedback signal to the feedback indicator 54. In response to the granted feedback signal, the feedback indicator 54 issues a granted feedback indication, e.g. a sound of a second type, different from the first type. The granted feedback signal is wirelessly transmitted from the receiver device 34 to the transmitter device 32.

Figure 5:
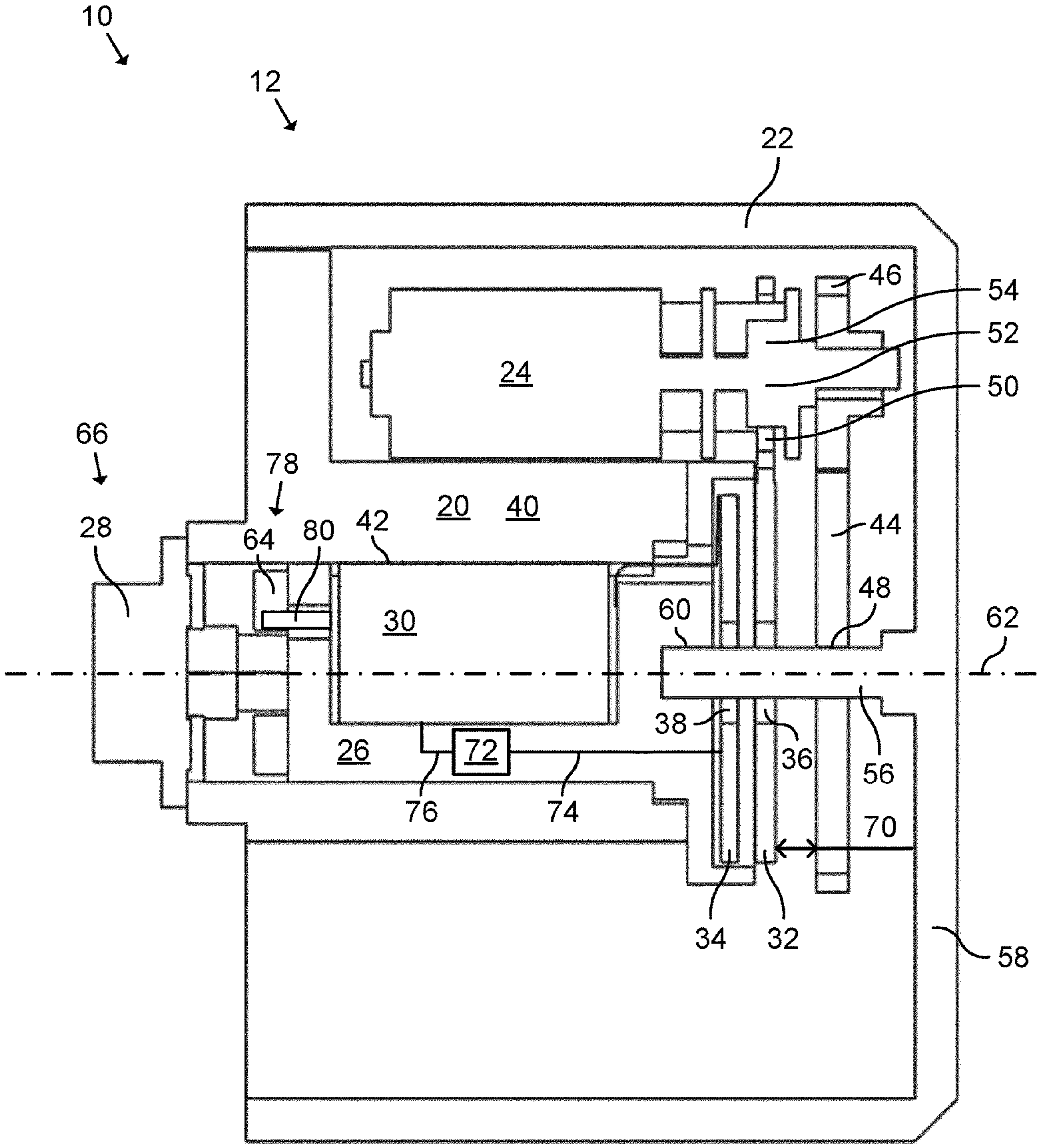
FIG. 5: schematically represents a cross-sectional side view of the actuating device when a transfer device adopts an unlocked state.

FIG. 5 schematically represents a cross-sectional side view of the actuating device 12 when the coupling device 30 has adopted the unlocked state 78. In FIG. 5, the actuator pin 80 of the coupling device 30 can be seen. In the unlocked state 78, the actuator pin 80 is driven to protrude to engage the recess 64 of the locking member 28. When the coupling device 30 has adopted the unlocked state 78, manual rotation of the actuating element 22 is transmitted to a rotation of the locking member 28 from the locked position 66 to the unlocked position. Rotation of the locking member 28 from the locked position 66 to the unlocked position causes the driver 18 to move from a driver locked position to a driver unlocked position to open the lock device 10.

In case the actuating device 12 is subjected to a brute force attack, for example if the actuating element 22 is smashed by a hammer, removal of the actuating element 22 will cause the connection member 56 to fall out from the shape lock 60. In this way, generation of electric energy and rotation of the spindle 26 is made difficult. Moreover, the credential evaluation electronics 72 is not exposed even if the actuating element 22 is removed.

Figure 6:
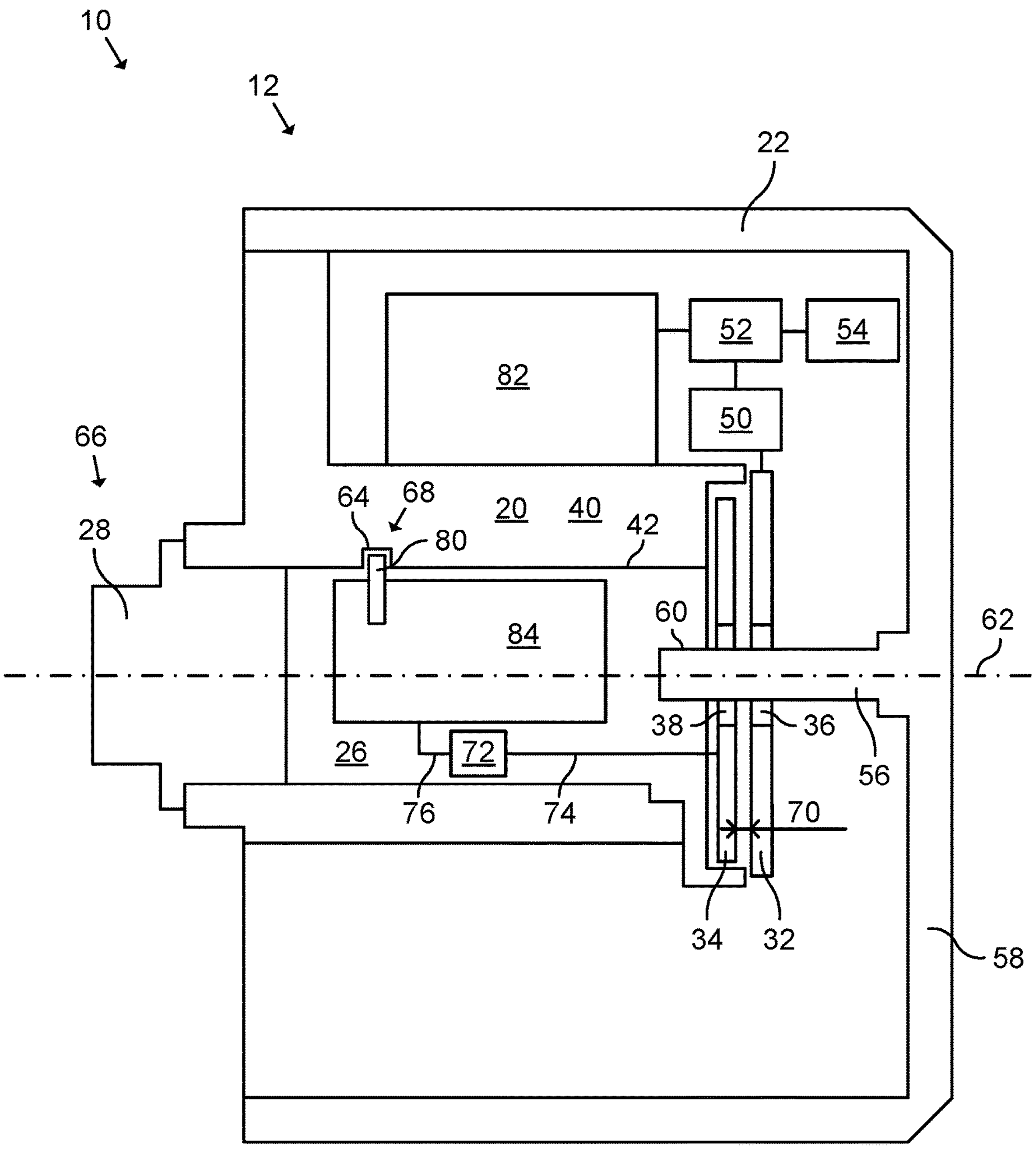
FIG. 6: schematically represents a cross-sectional side view of a further example of an actuating device.

FIG. 6 schematically represents a cross-sectional side view of a further example of an actuating device 12. Mainly differences with respect to FIGS. 2-5 will be described. Instead of the generator 24, the actuating device 12 in FIG. 6 comprises a battery 82. Moreover, instead of the coupling device 30, the actuating device 12 comprises a blocking device 84. The battery 82 and the blocking device 84 are further examples of a power source and a transfer device, respectively, according to the present disclosure.

In FIG. 6, the locking member 28 is fixed to the spindle 26. The actuator pin 80 is arranged to selectively engage a recess 64 in the stationary structure 20. In FIG. 6, the actuator pin 80 engages the recess 64 and the blocking device 84 thereby adopts the locked state 68. When the blocking device 84 adopts the locked state 68, the spindle 26 cannot be rotated. Consequently, also the actuating element 22 cannot be rotated.

If access is granted, i.e. if the access signal 74 contains a valid credential, the credential evaluation electronics 72 sends an authorization signal 76 to the blocking device 84. In response to the authorization signal 76, the blocking device 84 moves from the locked state 68 to the unlocked state 78. Moreover, the credential evaluation electronics 72 sends a granted feedback signal to the feedback indicator 54. In response to the granted feedback signal, the feedback indicator 54 issues a granted feedback indication, e.g. a sound. The granted feedback signal is wirelessly transmitted from the receiver device 34 to the transmitter device 32.

Figure 7:
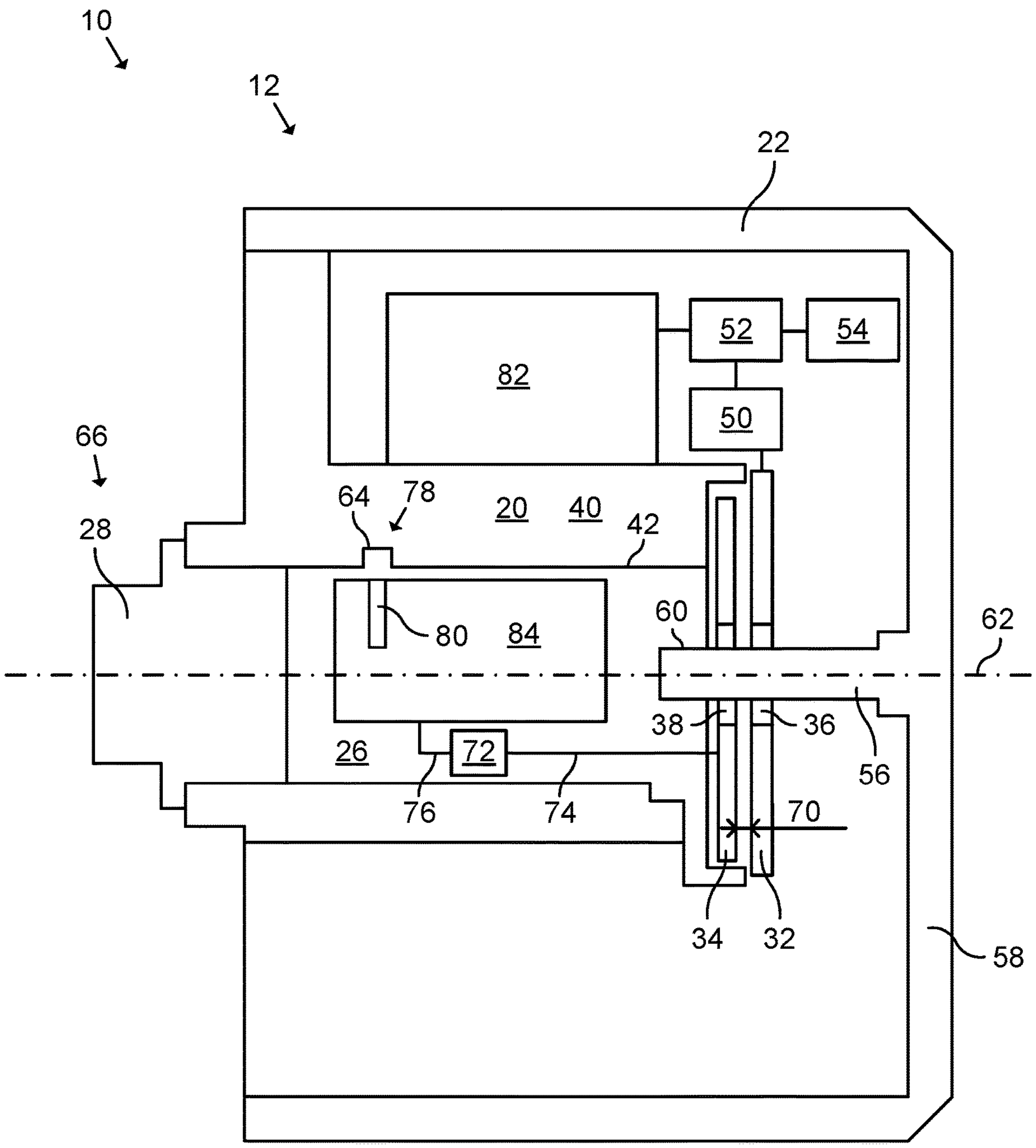
FIG. 7: schematically represents a cross-sectional side view of the actuating device in FIG. 6 when a transfer device adopts an unlocked state.

FIG. 7 schematically represents a cross-sectional side view of the actuating device 12 in FIG. 6 when the blocking device 84 adopts the unlocked state 78. In the unlocked state 78, the actuator pin 80 is retracted out from the recess 64 and rotation of the spindle 26 is consequently unblocked. The spindle 26 and the locking member 28 can thereby be rotated in common by manual rotation of the actuating element 22. When the transfer device is constituted by the blocking device 84, the locked state 68 and the unlocked state 78 are thus constituted by a blocked state and an unblocked state, respectively.

Figure 8:
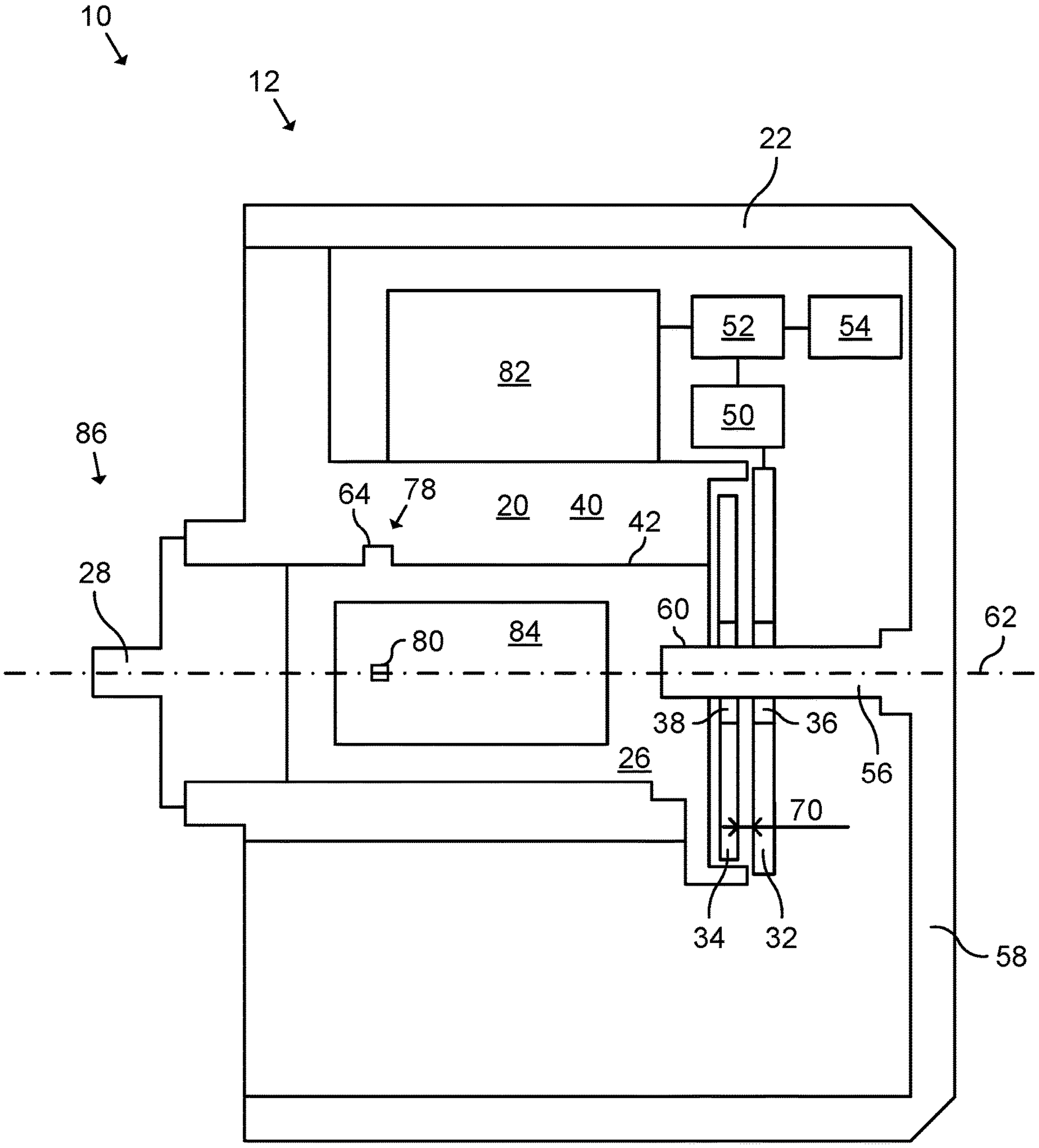
FIG. 8: schematically represents a cross-sectional side view of the actuating device in FIGS. 6 and 7 when a locking member is in an unlocked position.

FIG. 8 schematically represents a cross-sectional side view of the actuating device 12 in FIGS. 6 and 7 when the locking member 28 is in the unlocked position 86.

While the present disclosure has been described with reference to exemplary embodiments, it will be appreciated that the present invention is not limited to what has been described above. For example, it will be appreciated that the dimensions of the parts may be varied as needed. Accordingly, it is intended that the present invention may be limited only by the scope of the claims appended hereto.

What is claimed is:

1. An actuating device for a lock device, the actuating device comprising:
- a stationary structure;
- an actuating element rotatable relative to the stationary structure;
- an electric power source;
- a spindle arranged to be rotated by rotation of the actuating element;
- a locking member movable between a locked position and an unlocked position;
- an electromechanical transfer device arranged in the spindle, the electromechanical transfer device being configured to adopt a locked state, in which the locking member cannot be moved from the locked position to the unlocked position by rotation of the actuating element, and an unlocked state in which the locking member can be moved from the locked position to the unlocked position by rotation of the actuating element;
- a receiver device fixed with respect to the spindle, the receiver device being electrically connected to the electromechanical transfer device; and
- a transmitter device fixed with respect to the stationary structure and arranged to be electrically powered by the power source, the transmitter device being configured to wirelessly transmit power to the receiver device.

2. The actuating device according to claim 1, wherein the electromechanical transfer device comprises a coupling device configured to couple the spindle to the locking member when adopting the locked state, and configured to decouple the spindle from the locking member when adopting the unlocked state.

3. The actuating device according to claim 1, wherein the power source comprises an electromagnetic generator arranged to be driven by rotation of the actuating element to thereby generate electric energy.

4. The actuating device according to claim 1, wherein the transmitter device is configured to inductively transmit power to the receiver device.

5. The actuating device according to claim 1, wherein the transmitter device comprises an electromagnetic wave transmission coil and the receiver device comprises an electromagnetic wave receiving coil.

6. The actuating device according to claim 1, wherein the spindle is rotatable about a rotation axis, and wherein each of the transmitter device and the receiver device is substantially centered with respect to the rotation axis.

7. The actuating device according to claim 1, wherein the spindle is arranged inside the stationary structure.

8. The actuating device according to claim 1, further comprising a connection member functionally connected between the actuating element and the spindle, wherein the connection member is arranged to release upon removal of the actuating element.

9. The actuating device according to claim 8, wherein the connection member is connected to the spindle by means of a shape lock.

10. The actuating device according to claim 8, wherein the connection member is a bar.

11. The actuating device according to claim 1, wherein the transmitter device is configured to wirelessly transmit a signal to the receiver device.

12. The actuating device according to claim 1, further comprising credential evaluation electronics provided in the spindle and credential reading electronics, the credential evaluation electronics being configured to evaluate an access signal from the credential reading electronics and to issue an authorization signal to the electromechanical transfer device to adopt the unlocked state upon a granted evaluation of the access signal.

13. The actuating device according to claim 12, wherein the credential reading electronics are fixed with respect to the stationary structure, and wherein the transmitter device is configured to wirelessly transmit the access signal to the receiver device.

14. The actuating device according to claim 1, wherein the power source is fixed with respect to the stationary structure.

15. A lock device comprising an actuating device according to claim 1.

* * * * *